United States Patent
Tracy et al.

(10) Patent No.: US 7,540,748 B2
(45) Date of Patent: Jun. 2, 2009

(54) FLEXIBLE I/O CONNECTION SYSTEM AND METHOD

(75) Inventors: Mark S. Tracy, Tomball, TX (US); Memphis-Zhihong Yin, Tomball, TX (US); Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/786,098

(22) Filed: Apr. 11, 2007

(65) Prior Publication Data

US 2008/0254684 A1     Oct. 16, 2008

(51) Int. Cl.
*H01R 13/44*    (2006.01)
(52) U.S. Cl. .................. 439/131; 439/928.1; 439/23
(58) Field of Classification Search ............ 439/13–24, 439/27, 131, 928.1
See application file for complete search history.

(56) References Cited

U.S. PATENT DOCUMENTS

| | | | |
|---|---|---|---|
| 4,932,882 A * | 6/1990 | Kang | 439/22 |
| 5,805,412 A | 9/1998 | Yanagisawa | |
| 5,888,078 A * | 3/1999 | Lecreux et al. | 439/131 |
| 5,975,927 A | 11/1999 | Giles | |
| 6,042,426 A * | 3/2000 | Byrne | 439/654 |
| 6,093,038 A | 7/2000 | Chen et al. | |
| 6,188,572 B1 * | 2/2001 | Liao et al. | 361/686 |
| 6,273,735 B1 | 8/2001 | Johnson et al. | |
| 6,290,517 B1 | 9/2001 | Anderson | |
| 6,321,340 B1 | 11/2001 | Shin | |
| 6,377,471 B1 * | 4/2002 | Chong et al. | 361/796 |
| 6,599,143 B1 * | 7/2003 | Chong et al. | 439/247 |
| 6,650,549 B1 * | 11/2003 | Chiao | 361/785 |
| 6,786,743 B2 * | 9/2004 | Huang | 439/131 |
| 6,942,149 B2 | 9/2005 | Fujii et al. | |
| 7,066,767 B2 * | 6/2006 | Liao | 439/639 |
| 7,101,187 B1 * | 9/2006 | Deconinck et al. | 439/22 |
| 7,171,505 B2 | 1/2007 | Kuhlmann | |
| 7,212,420 B2 * | 5/2007 | Liao | 363/146 |
| 7,494,349 B1 * | 2/2009 | Huang et al. | 439/131 |
| 2003/0151938 A1 * | 8/2003 | Liao | 363/146 |
| 2006/0234540 A1 | 10/2006 | Tipley et al. | |
| 2007/0141898 A1 * | 6/2007 | Mayette et al. | 439/502 |

FOREIGN PATENT DOCUMENTS

KR     20-0399441     10/2005

* cited by examiner

*Primary Examiner*—James Harvey

(57) ABSTRACT

A flexible input/output (I/O) connection system comprises an electronic device having a housing with at least one I/O window for receiving a connection to an external device, and a hub disposed in the housing and having a plurality of I/O connectors, the hub movable within the housing to position a select one of the plurality of I/O connectors in the I/O window.

24 Claims, 3 Drawing Sheets

FLEXIBLE I/O CONNECTION SYSTEM AND METHOD

BACKGROUND

Electronic devices, such as notebook computers, desktop computers, gaming devices, etc., generally have input/output (I/O) connectors to facilitate attaching various types of external devices to the electronic device, such as a power adapter, a universal serial bus (USB) cable, an Ethernet connection, etc. However, the amount of surface area on the electronic device for locating the I/O connectors is limited (e.g., space is needed for locating batteries, cooling vents, bezels, etc.). Thus, there is usually insufficient space on the electronic device for locating the desired types and/or quantities of I/O connectors.

DETAILED DESCRIPTION OF THE DRAWINGS

Figure 1:
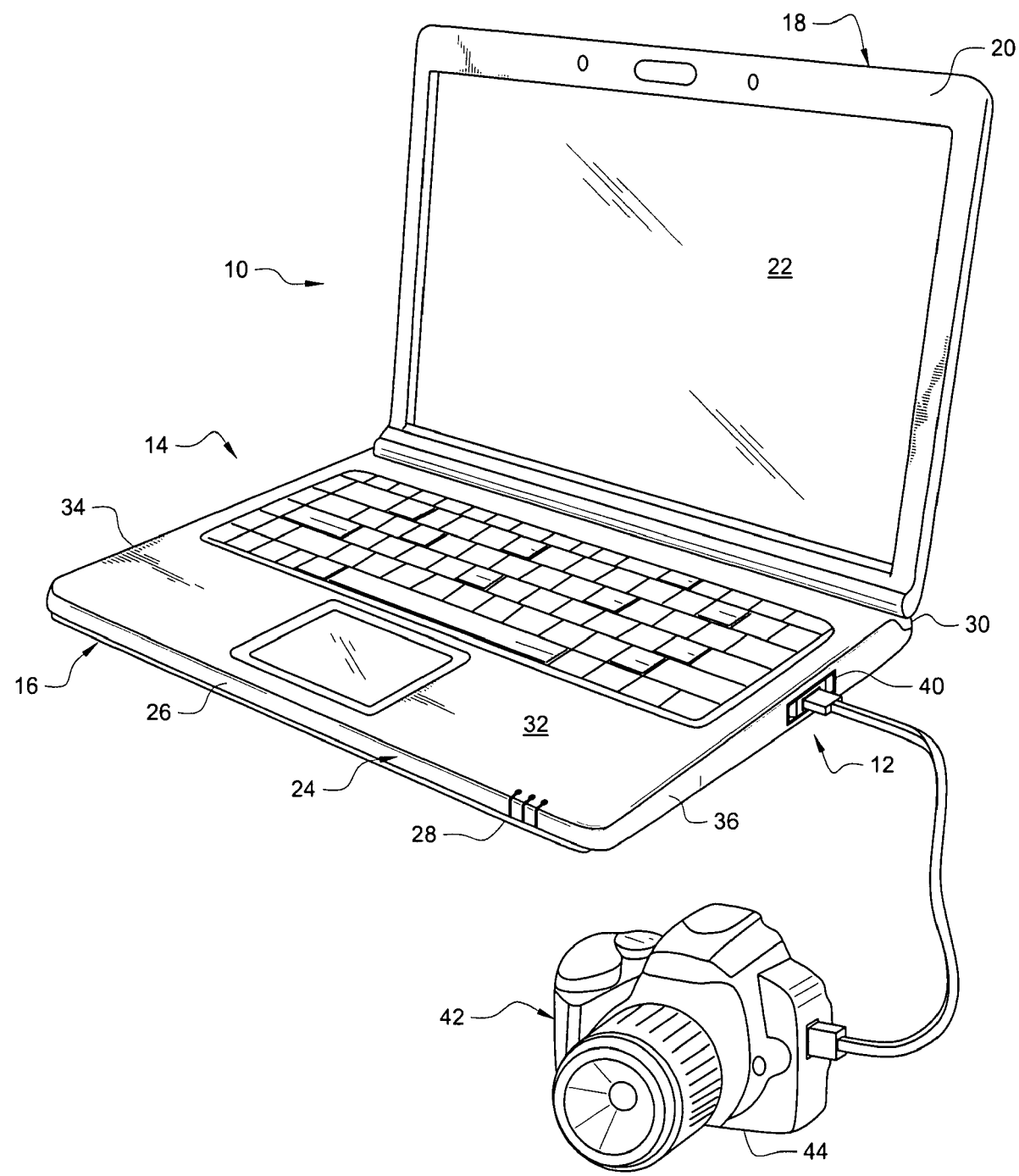
FIG. 1 is a diagram illustrating an electronic device in which an embodiment of a flexible input/output (I/O) connector system is used to advantage.
Figure 2:
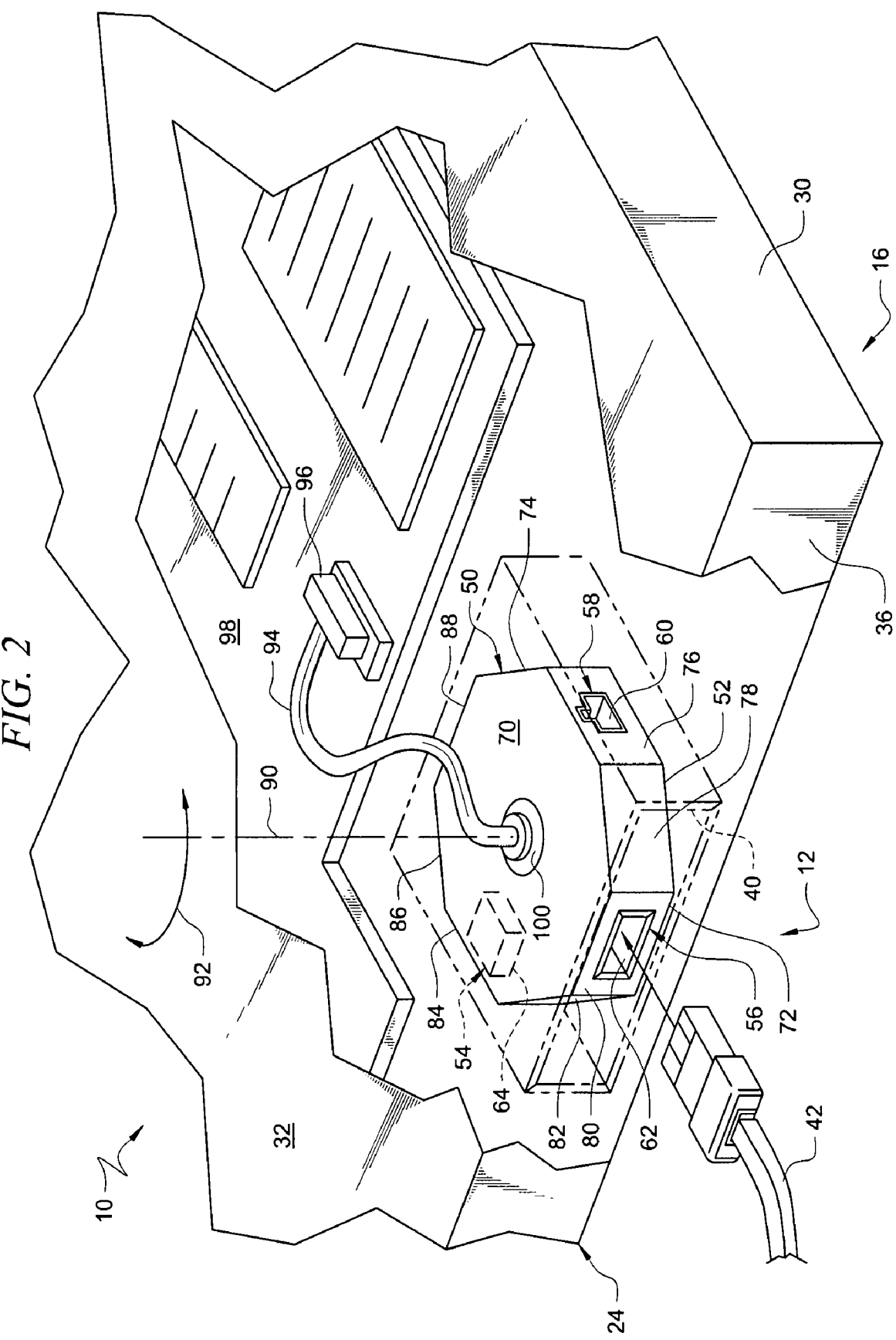
FIG. 2 is a diagram illustrating the electronic device and I/O connector system of FIG. 1 with a portion of the electronic device broken away.
Figure 3:
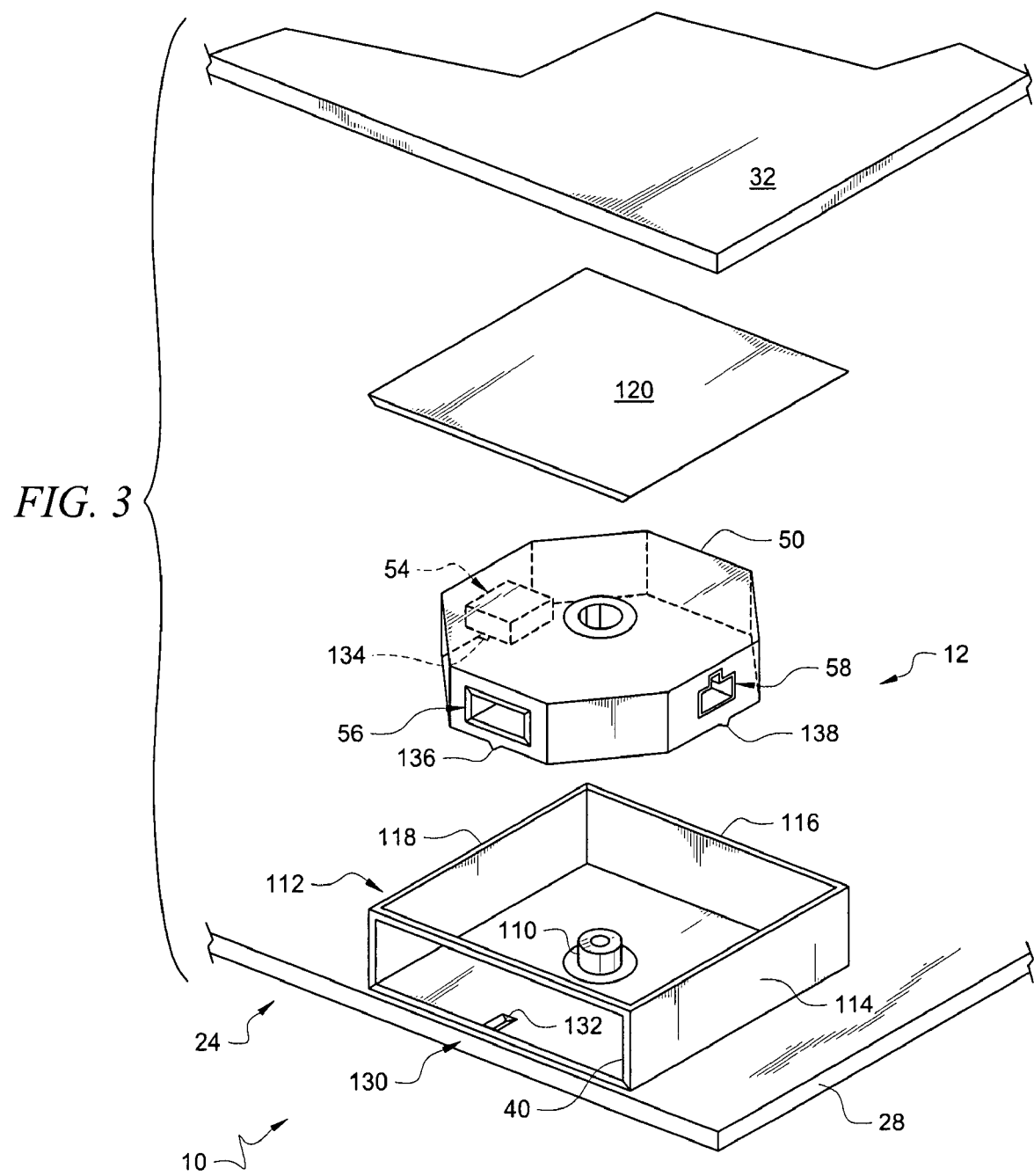
FIG. 3 is a diagram illustrating an exploded view of the I/O connector system of FIGS. 1 and 2.

Embodiments and the advantages thereof are best understood by referring to FIGS. 1-3 of the drawings, like numerals being used for like and corresponding parts of the various drawings.

FIG. 1 is a diagram illustrating an electronic device 10 in which an embodiment of a flexible input/output (I/O) connection system 12 is employed to advantage. In the embodiment illustrated in FIG. 1, electronic device 10 comprises a notebook computer 14 having a base member 16 coupled to a display member 18. However, it should be understood that electronic device 10 may comprise other types of devices such as, but not limited to, a tablet computer, desktop computer, gaming device, media player or any other type of device configured to have an external device coupled thereto. In the embodiment illustrated in FIG. 1, display member 18 comprises a housing 20 surrounding and/or otherwise supporting a display screen 22, and base member 16 comprises a housing 24 formed from a front wall 26, a bottom wall 28, a rear wall 30, an upper wall defining a working surface 32, and a pair of side walls 34 and 36.

In FIG. 1, housing 24 comprises at least one I/O opening or window 40 disposed therein to facilitate coupling of electronic device 10 to an external device 42. In the embodiment illustrated in FIG. 1, external device 42 comprises a digital camera 44; however, it should be understood that external device 42 may comprise any type of device configured to be removably couplable to electronic device 10 such as, but not limited to, a printer, wireless receiver (e.g., for receiving a wireless signal from a wireless keyboard and/or wireless mouse), a media or memory card, a universal serial bus (USB) memory stick, a power adapter (e.g., an alternating current (AC) adapter) or any other type of couplable device. In the embodiment illustrated in FIG. 1, I/O window 40 is located in housing 24 of base member 16. However, it should be understood that I/O window 40 may be otherwise located on electronic device 10 such as in display member 18 or in both base member 16 and display member 18.

FIG. 2 is a diagram illustrating electronic device 10 and I/O connection system 12 of FIG. 1 with a portion of electronic device 10 broken away. In the embodiment illustrated in FIG. 2, system 12 comprises a connector hub 50 disposed within housing 24 of base member 16. In FIG. 2, connector hub 50 comprises a housing 52 having three I/O connectors 54, 56 and 58 disposed thereon. For example, in the embodiment illustrated in FIG. 2, I/O connector 58 comprises a telephone, ethernet or RJ-45 jack 60, I/O connector 56 comprises a USB connector 62, and I/O connector 54 comprises an AC adapter plug 64. However, it should be understood that the types of I/O connectors disposed on connector hub 50 may be otherwise varied. For example, in the embodiment illustrated in FIG. 2, connector hub 50 comprises three different types of I/O connectors. However, it should be understood that connector hub 50 may be configured with multiple I/O connectors of the same type. For example, in the embodiment illustrated in FIG. 2, housing 52 comprises an upper face 70, a lower face 72 and side faces 74, 76, 78, 80, 82, 84, 86 and 88. In FIG. 2, each of side faces 76, 80 and 84 comprise a single I/O connector (e.g., I/O connectors 58, 56 and 54, respectively). However, it should be understood that connector hub 50 may be configured with multiple I/O connectors on a single side face of housing 52. Further, in the embodiment illustrated in FIG. 2, I/O connectors are illustrated as being disposed on three side faces of connector hub 50 (e.g., side faces 76, 80, and 84). However, additionally or alternatively, it should be understood that I/O connectors may also be located on other side faces of housing 52. Thus, it should be understood that the quantity, locations and/or types of I/O connectors disposed on connector hub 50 may be varied.

In the embodiment illustrated in FIG. 2, connector hub 50 is rotatably coupled to housing 24 of base member 16 and rotatable within housing 24 to place a select one of I/O connectors 54, 56 and 58 within I/O window 40 such that the select I/O connector 54, 56 or 58 is facing outwardly from housing 24 to facilitate connection therewith by external device 42. For example, in the embodiment illustrated in FIG. 2, connector hub 50 is rotatable about an axis 90 disposed substantially perpendicular to working surface 32 such that connector hub 50 is rotatable in the directions indicated by arrow 92 to facilitate locating a select one of I/O connectors 54, 56 and 58 within I/O window 40. In the embodiment illustrated in FIG. 2, connector hub 50 is configured to be rotatable within housing 24 to facilitate placement of a desired I/O connector within I/O window 40. However, it should be understood that connector hub 50 may be otherwise configured (e.g., connector hub 50 may be configured for translatable movement within housing 24 or rotatable about a different axis within housing 24).

In the embodiment illustrated in FIG. 2 system 12 comprises a conduit, cable or other type of electrical/communication medium 94 for coupling I/O connectors 54, 56 and 58 to other components within electronic device 10. For example, in the embodiment illustrated in FIG. 2, medium 94 is coupled to a connector element 96 disposed on a motherboard 98 disposed within housing 24. In some embodiments, connector element 96 is communicatively coupled to other components on motherboard 98 and/or elsewhere in electronic device 10 to facilitate coupling of I/O connectors 54, 56 and 58 to a corresponding component of electronic device 10. However, it should be understood that system 12 may be configured such that multiple, discrete mediums 94 extend from connector hub 50 (e.g., one corresponding to each I/O connector) to couple particular I/O connectors to corresponding components of electronic device 10. In the embodiment illustrated in FIG. 2, medium 94 is coupled to a central location 100 of surface 70 of connector hub 50 to facilitate rotation of connector hub 50 while minimizing cable movement within housing 24. However, it should be understood that connector hub 50 may be otherwise configured.

FIG. 3 is a diagram illustrating an exploded view of a portion of electronic device 10 and I/O connection system 12 of FIGS. 1 and 2. In the embodiment illustrated in FIG. 3, connector hub 50 is rotatably coupled to a post or spindle 110 to facilitate rotation of connector hub 50 within electronic device 10. In FIG. 3, connector hub 50 is located within an enclosure 112 disposed within electronic device 10 to substantially prevent and/or eliminate dust, debris and/or other unwanted materials from entering into an interior area of housing 24 via I/O window 40. For example, in the embodiment illustrated in FIG. 3, enclosure 112 comprises side walls 114, 116 and 118. Bottom wall 28 of housing 24 encloses a bottom portion of enclosure 112, and a top wall 120 encloses an upper portion of enclosure 112. However, it should be understood that system 12 may also be configured without enclosure 112.

In the embodiment illustrated in FIG. 3, system 12 comprises one or more locking elements 130 configured to releasably secure connector hub 50 in a desired location relative to housing 24 to releasably secure a particular one of I/O connectors 54, 56 and 58 within I/O window 40. For example, in the embodiment illustrated in FIG. 3, locking element 130 comprises a detent 132 disposed on a lower surface of enclosure 112 configured to cooperate with corresponding extensions 134, 136 and 138 formed on connector hub 50. In operation, detent 132 is configured to cooperate with extensions 134, 136 or 138 to releasably secure connector hub 50 in a desired location to cause a select one of corresponding I/O connectors 54, 56 and 58 to be disposed within I/O window 40. In the embodiment illustrated in FIG. 3, detent 132 is centrally located within I/O window 40 and extensions 134, 136 and 138 are disposed in alignment and/or otherwise coincident with respective I/O connectors 54, 56 and 58 such that extensions 134, 136 and 138 cooperate with detent 132 to releasably secure the respective I/O connectors 54, 56 and 58 within I/O window 40. However, it should be understood that locking element 130 may be otherwise configured.

Thus, embodiments of system 12 enable a user to rotate connector hub 50 (e.g., a user's finger may be used to manually rotate connector hub 50 by contacting connector hub 50 through I/O window 40) to place a desired I/O connector within I/O window. However, it should be understood that system 12 may also be configured to have connector hub 50 automatically rotatable (e.g., by employing a motor or other type of drive device coupled to connector hub 50 such that, in response to a selection by a user of a graphical icon, actuatable button, or other device, connector hub 50 is automatically rotated to place a desired I/O connector within I/O window 40). Thus, embodiments of system 12 provide flexibility in connecting electronic device 10 to different types of external devices and/or devices having different types of connectors or connection mediums. Further, embodiments of system 12 provide greater flexibility for providing different types of I/O connectors while utilizing less surface area along the sides or other areas of the electronic device 10.

What is claimed is:

1. A computer, comprising:
    a housing;
    a display connected to the housing; and
    a hub in the housing and including a plurality of different input/output (I/O) connectors that are accessible through an I/O window, wherein the hub is rotatable within the housing to position one of the plurality of different I/O connectors in the I/O window to connect the computer to an external electronic device.

2. The computer of claim 1, wherein the plurality of different I/O connectors includes a universal serial bus (USB) connector and an alternating current (AC) connector.

3. The computer of claim 1, wherein the hub has eight sides.

4. The computer of claim 1, wherein the computer is a notebook computer.

5. The computer of claim 1, wherein the hub is manually rotatable about a post by a user of the computer to select one of the plurality of different I/O connectors in the I/O window.

6. The computer of claim 1, further comprising at least one locking element configured to releasably secure one of the plurality of different I/O connectors in the I/O window.

7. The computer of claim 1, further comprising at least one locking element configured to releasably secure the hub in a particular position relative to the housing.

8. A method, comprising:
    providing a computer having a display and a housing with at least one input/output (I/O) window that connects to an external device; and
    disposing a hub in the housing and having a plurality of I/O connectors, the hub movable within the housing to position a select one of the plurality of I/O connectors in the I/O window.

9. The method of claim 8, further comprising providing at least one locking element configured to releasably secure the hub in a particular position relative to the housing.

10. The method of claim 8, further comprising providing at least one locking element configured to releasably secure the select one of the plurality of I/O connectors in the I/O window.

11. The method of claim 8, further comprising positioning the hub on a post to facilitate rotation of the hub within the I/O window.

12. The method of claim 8, further comprising configuring the hub with at least two different types of I/O connectors.

13. The method of claim 8, further comprising coupling the hub to the housing to enable manual actuation of the hub by a user of the computer to place one of the plurality of I/O connectors in the I/O window.

14. A computer, comprising:
    a housing;
    a display connected to the housing; and
    a hub including a plurality of input/output (I/O) connectors that are accessible through an I/O window, wherein the hub is movable within the housing to position one of the plurality of I/O connectors in the I/O window to connect the computer to an external electronic device.

15. The computer of claim 14, wherein the hub is rotatable within the housing.

16. The computer of claim 14, wherein the hub has different I/O connectors on three different side faces.

17. The computer of claim 14, wherein the hub is manually actuatable by a user of the computer to place one of the plurality of I/O connectors facing outwardly from the housing.

18. The computer of claim 14, further comprising at least one locking element configured to releasably secure one of the plurality of I/O connectors facing outwardly from the housing.

19. The computer of claim 14, further comprising at least one locking element configured to releasably secure the hub in a particular position relative to the housing.

20. An electronic device, comprising:
    a housing with a display; and a hub including a plurality of different input/output (I/O) connectors that are accessible through an I/O window, wherein the hub is movable within the housing to position different ones of the plurality of different I/O connectors in the I/O window to connect the electronic device to external electronic devices.

21. The electronic device of claim 20, wherein the plurality if different I/O connectors includes an alternating current (AC) connector.

22. The electronic device of claim 20, wherein the hub is manually rotatable by a user of the electronic device.

23. The electronic device of claim 20, further comprising at least one locking element configured to releasably secure the hub in at least one of the at least two different positions.

24. The electronic device of claim 20, wherein at least two of the plurality of I/O connectors comprise different types of I/O connectors.

\* \* \* \* \*